United States Patent
Chan et al.

(10) Patent No.: US 6,871,196 B1
(45) Date of Patent: Mar. 22, 2005

(54) VISUALIZING AUTOMATICALLY GENERATED SEGMENTS

(75) Inventors: Stella Chan, Kirkland, WA (US); Usama Fayyad, Mercer Island, WA (US); Neal Rothleder, Kirkland, WA (US)

(73) Assignee: Revenue Science, Inc., Bellevue, WA (US)

( * ) Notice: Subject to any disclaimer, the term of this patent is extended or adjusted under 35 U.S.C. 154(b) by 521 days.

(21) Appl. No.: 09/751,366

(22) Filed: Dec. 29, 2000

(51) Int. Cl.[7] .................................................. G06N 5/00
(52) U.S. Cl. .......................................... 706/47; 706/45
(58) Field of Search ........................... 706/47; 382/115; 704/246; 705/1

(56) References Cited

U.S. PATENT DOCUMENTS

| | | | | |
|---|---|---|---|---|
| 5,557,686 A | * | 9/1996 | Brown et al. | 382/115 |
| 6,112,181 A | * | 8/2000 | Shear et al. | 705/1 |
| 6,219,639 B1 | * | 4/2001 | Bakis et al. | 704/246 |

* cited by examiner

Primary Examiner—Wilbert L. Starks, Jr.
(74) Attorney, Agent, or Firm—Perkins Coie LLP

(57) ABSTRACT

A software facility for analyzing each of a plurality of groups of items is described. The facility retrieves information identifying, for each of a plurality of groups, items that are members of the group. For each group, the facility analyzes attributes of the items of the group to identify attributes that distinguish items that are members of the group from items that are not members of the group.

39 Claims, 18 Drawing Sheets

| | 501 | 502 | 503 User Group Table 500 |
|---|---|---|---|
| | Group | User ID | User Attributes |
| | ⋮ | | |
| 510 | 3 | 5 | PurchasedAnyProduct, PurchasedAdventureGame |
| 511 | 3 | 16 | PurchasedAnyProduct, PurchasedDrivingGame |
| 512 | 3 | 63 | PurchasedAnyProduct, PurchasedAdventureGame |
| 513 | 3 | 64 | PurchasedAnyProduct, PurchasedAdventureGame |
| 515 | 3 | 65 | PurchasedAnyProduct, PurchasedAdventureGame, PurchasedDrivingGame |
| 515 | 3 | 67 | ViewedHomePage |
| 516 | 3 | 69 | PurchasedAnyProduct, PurchasedAdventureGame |
| 517 | 3 | 84 | PurchasedAnyProduct, PurchasedDrivingGame |
| 518 | 3 | 89 | PurchasedAnyProduct, PurchasedAdventureGroup, PurchasedDrivingGame |
| 519 | 3 | 90 | PurchasedAnyProduct, PurchasedAdventureGame |
| | | | |
| 520 | 4 | 6 | PurchasedAnyProduct, PurchasedAdventureGame, ViewedHardDrivePage |
| 521 | 4 | 7 | ViewedPage, ViewedHardDrivePage, ViewedNetworkCardPage |
| 522 | 4 | 26 | ViewedHardDrivePage, ViewedNetworkCardPage |
| 523 | 4 | 44 | ViewedRacingGamePage, ViewedNetworkCardPage |
| 524 | 4 | 46 | CheckedOrderStatus, ViewedHardDrivePage, ViewedNetworkCardPage |
| 525 | 4 | 52 | ViewedHomePage, ViewedNetworkCardPage |
| 526 | 4 | 55 | ViewedHardDrivePage, ViewedNetworkCardPage |
| | ⋮ | | |

*Fig. 5*

Attributes Table 600
| Attribute | Threshold | Icon ID | Positive Icon Image | Negative Icon Image |
|---|---|---|---|---|
| ViewedHomePage | 80 | 1 |  |  |
| CheckedOrderStatus | 41 | 2 |  | |
| PurchasedAnyProduct | 50 | 3 |  |  |
| UsedCoupon | 70 | 4 |  |  |
| ViewedAdventureGamePage | 55 | 5 |  | |
| PurchasedAdventureGame | 55 | 6 |  |  |
| ViewedRacingGamePage | 60 | 5 |  | |
| Purchased Racing Game | 60 | 6 |  |  |
| ViewedNetworkCardPage | 72 | 5 |  | |
| PurchasedNetworkCard | 72 | 6 |  |  |
| ViewedHardDrivePage | 71 | 5 |  | |
| PurchasedHardDrive | 68 | 6 |  |  |
*Fig. 6*

|  | Cluster Membership | |
|---|---|---|
| Attribute $a_j$ | In $C_i$ | Not in $C_i$ |
| True | $a$ | $b$ |
| False | $c$ | $d$ |

*Fig. 7*

VISUALIZING AUTOMATICALLY GENERATED SEGMENTS

TECHNICAL FIELD

The present invention is directed to the fields of contact management and data mining, and, more particularly, to the field of visualizing automatically generated segments.

BACKGROUND

The World Wide Web ("the Web") provides a forum for obtaining information and engaging in commercial transactions. In order to provide information and/or solicit commercial transaction via the Web, a company or other Web publisher establishes a Web site. In order to establish a Web site, the publisher typically connects its own server computer system to the Internet, or secures the use of a server computer system already connected to the Internet. This server executes a Web server program to deliver Web pages and associated data to users via the Internet in response to their requests. Users make such requests using client computer systems, which are generally connected to the Internet via an Internet Service Provider ("ISP").

As a diagnostic and monitoring measure, some Web server programs maintain a log of the requests that they receive and the action that they take in response. Although such logs can contain useful information for analyzing users' interactions with a Web site, such information can be difficult to extract from Web server log files. Such Web server log files are typically very large, often measured in megabytes or gigabytes; they are full of extraneous information; their content is expressed in a terse form that is difficult to understand; and they are formatted in a manner that makes their content difficult to visually discern.

Classical segmentation is often used to discern various groups within the users. The visualization problem to be solved is how to provide a user interface that represent groups of items for users where the groups are generated by automatic data segmentation techniques.

Past techniques used general statistics of the data in a segment to describe each of the groups (also called "clusters"). The problem with this classical approach is that it does not scale to large or complex data sets that have a large number of variables, such as hundreds or thousands of variables. These techniques describe a group by presenting a set of measures either by listing all the measures or representing them with a set of charts. The problem of discerning which of these multitudes of variables are most important in describing each segment; and which are most important in distinguishing between various segments, is relegated to the end user (who may not be a statistician). Another problem is that for many applications, there are many attributes and representing many attributes either as measures or graphically fails to summarize how each group is distinguished from another. When faced with a large number of variables, simply listing or plotting this large number and presenting it to the user does not work: a combinatorial number of such listings are required to compare between segments.

Accordingly, an automated facility that characterized a group of users is having similar patterns of interaction, enabled a user to name the group based upon the characterization, and persistently maintained the group name for use in future reports would have significant utility.

BRIEF DESCRIPTION OF THE DRAWINGS

FIG. 5 is a table diagram showing an example of a table obtained by the facility containing this information.

FIG. 6 is a table diagram showing an attributes table used by the computer facility in compiling contents for characterization reports characterizing groups.

FIG. 7 is a table diagram showing the contingency table preferably used by the facility.

DETAILED DESCRIPTION

Figure 1:
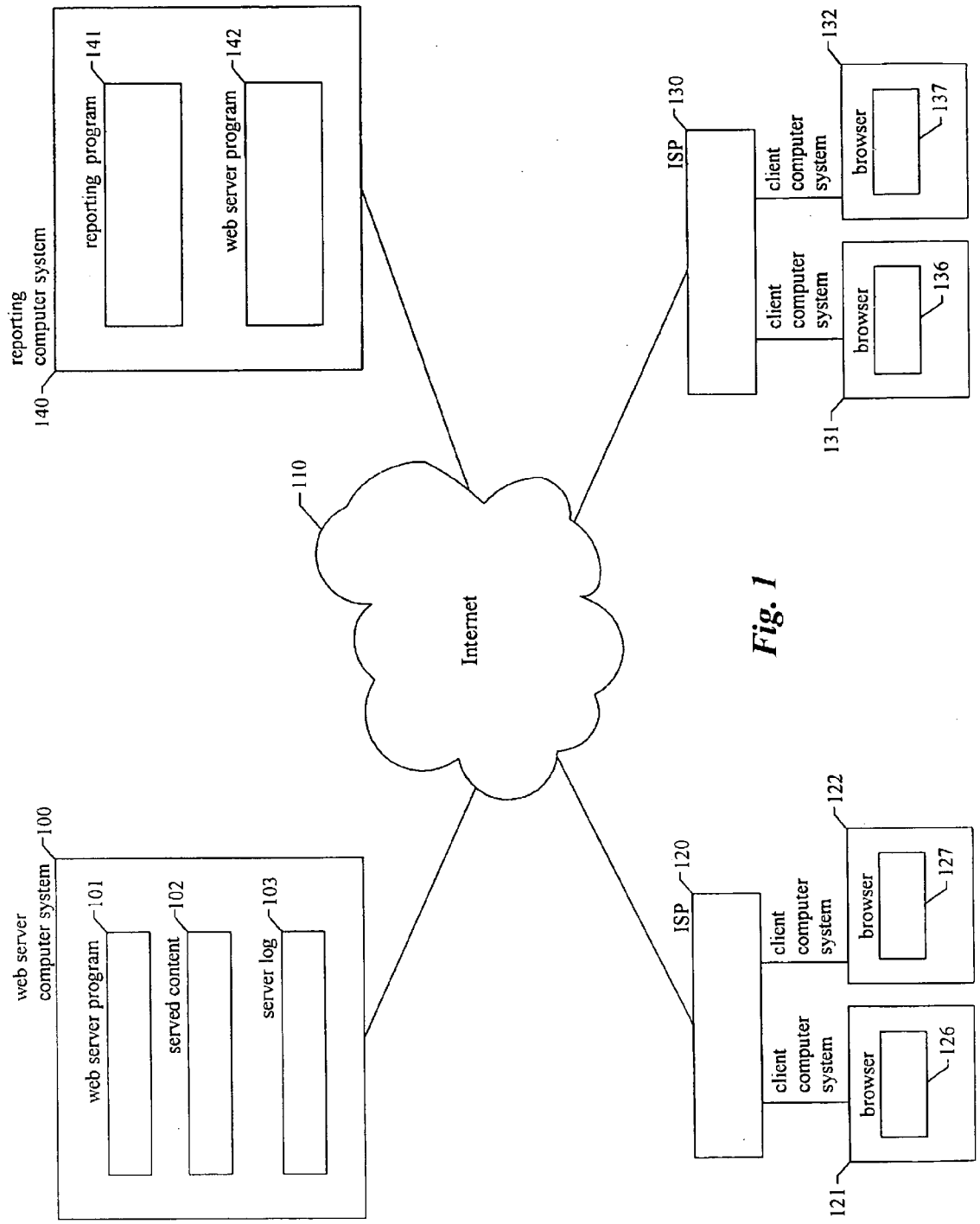
FIG. 1 is a high-level block diagram showing the environment in which the facility preferably operates.

Embodiments of the present invention provide a software facility ("the facility") for automatically characterizing and enabling a user to persistently name data segments containing items. For example, the facility preferably automatically characterizes and enables a user to persistently name subsets of the users of a particular Web site, called the "subject Web site."

The facility preferably receives information identifying one or more groups of items, such as groups identified among the items using data mining data segmentation techniques. The information received by the facility preferably also indicates, for each item in each group which attributes characterize the item from any number of possible attributes (for that item). For example, items that are users of a subject Web site may have attributes such as ViewedHomePage, indicating that the user viewed the home page of the subject Web site during a particular time period, or PurchasedAdventureGame, indicating that the user purchased a product from the subject Web site that is in an adventure game product category. In some embodiments, the items and their attributes are maintained in a data warehouse, which is populated by analyzing Web server log data, as well as data from other sources, such as user registration records maintained by the operator of the subject Web site.

Based upon the membership of the groups and the attributes of the items in each group, the facility applies additional data mining techniques to identify, for each group, characteristics of the items of the group that most significantly distinguish the group from other groups. The identified characteristics are generally having certain values for particular attributes. For example, the facility may determine that a given group of users is most significantly distinguished from other groups by the high percentage of users in the group that have a TRUE value for the PurchasedAdventureGame attribute, relative to a lower percentage of users outside the group that have a TRUE value for this attribute.

The facility preferably enables its user to display reports characterizing any of the groups. Such a report preferably indicates the top few distinguishing characteristics identified for the group. In some embodiments, the facility displays an icon in the report that graphically depicts the characteristic. For example, in a characterization report for a group of users distinguished by the large percentage of them that purchased a product in the adventure game category and the small percentage of them that visited the home page, the facility preferably displays a shopping cart icon to indicate a high rate of purchasing products in the adventure game category and displays a house icon overlaid with the circle-slash negation symbol to indicate a low rate of visiting the home page. In some embodiment, the report includes additional information for each characteristic, such as a description of the characteristic, the percentage of the members of the group that have the characteristic, the extent to which the characteristic differentiates the group, and links to detail information about the characteristic, such as links each to a Web page describing one of the products in the adventure game category that was most-purchased by members of the group.

The information presented by the facility in the characterization report gives the user of the facility a sense of the significance of the group that it characterizes. Armed with this information, the user of the facility can compose a mnemonic name for the group. The facility preferably provides a user interface for obtaining such a name from the user of the facility and storing it persistently with the group in the data warehouse for future display in conjunction with the group.

Accordingly, it can be seen that the facility assists users to conceptualize the significance of a particular group of items, and to persistently name the group for future reference.

FIG. 1 is a high-level block diagram showing the environment in which the facility preferably operates. The diagram shows a Web server computer system 100 that serves a Web site, user interactions with which are to be reported. On the Web server computer system are stored a Web server program 101 for serving the Web site, a content 102 of the Web site that is served, and a server log 103, containing an entry for, each Web serving action performed by the Web server program. The Web server computer system is accessed by a number of client computer systems, such as client computer systems 121, 122, 131, and 132, in order to browse the Web site in response to user commands. Each client computer system is generally connected to the Internet via an Internet service provider, or "ISP." For example, client computer system 121 and 122 are connected to the Internet via ISP 120. During browsing, Web pages of the Web site are displayed on the client computer system by a browser program, such as browser 126 on client computer system 121. In order to retrieve a Web page of the Web site or perform any other interaction with the Web site, the browser sends to the Web server computer system a Web server request, also called an "HTTP request". The Web server request contains a network address, called an "IP address" identifying the client computer system, the "source," or the "originator" of the request. The Web server request indicates the action to be taken by the Web server program, such as returning a specified Web page. If the Web server has stored a cookie for the Web site on the client computer system, the contents of this cookie are also included in the Web server request. When the Web server request is received in the Web server computer system by the Web server program, the Web server program takes the specified action, such as returning the specified file, and generates a server log entry containing the time and date, the originating IP address, the specified instruction, any cookie value included with the request, and various other details of how the request was handled, including how long it took to process and whether it was successful.

Reporting computer system 140 preferably stores a reporting program 141, which provides various functionalities of the facility, as well as a Web server program 142 for making reports generated by the reporting program available to users of any client computer system connected to the Internet, such as client computer systems 121, 122, 131, and 132.

While preferred embodiments are described in terms of the environment described above, those skilled in the art will appreciate that the facility may be implemented in a variety of other environments, including a single, monolithic computer system, as well as various other combinations of computer systems or similar devices.

Figure 2:
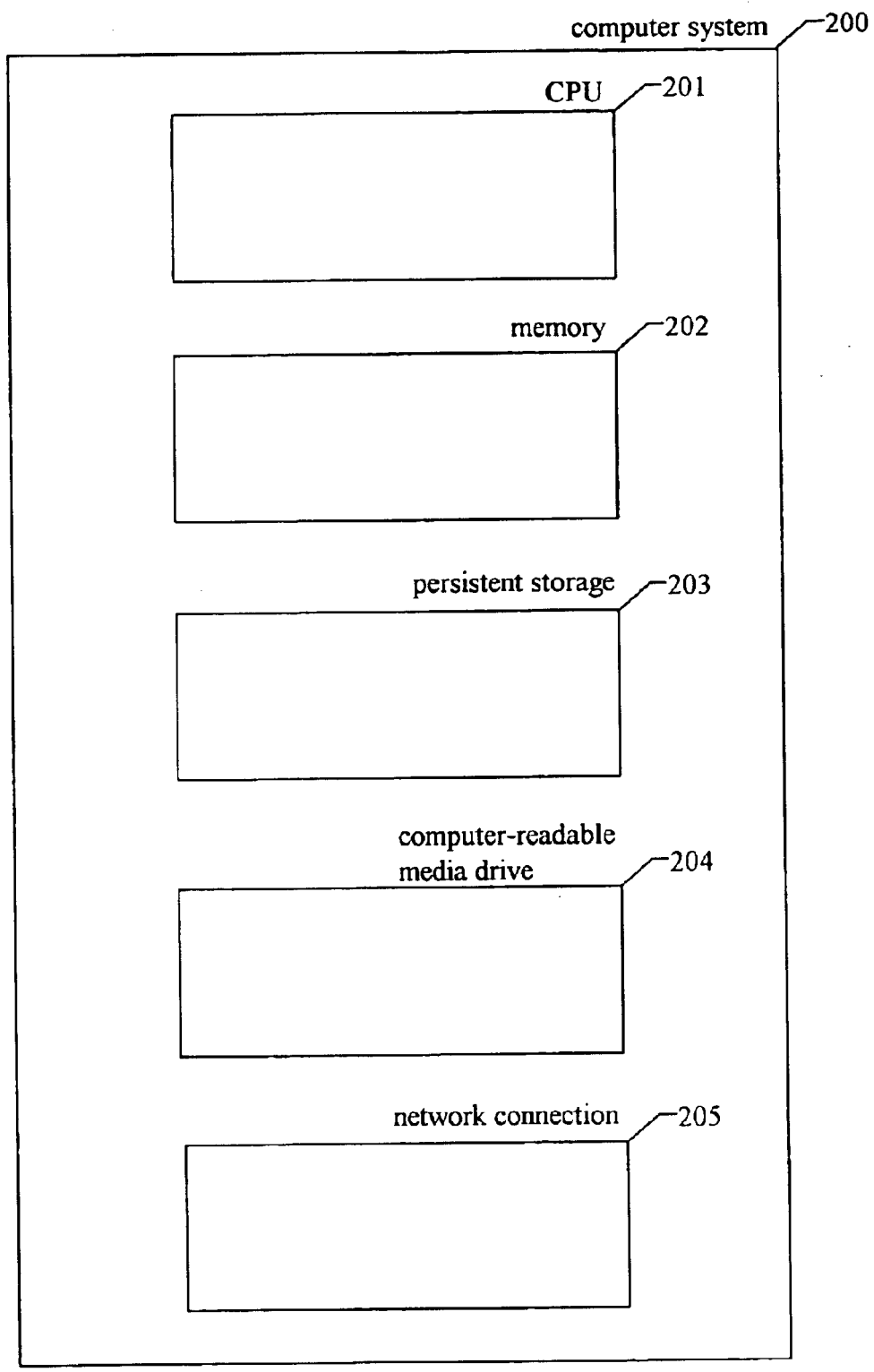
FIG. 2 is a block diagram showing some of the components preferably incorporated in the Web server, reporting, and client computer systems.

FIG. 2 is a block diagram showing some of the components preferably incorporated in the Web server, reporting, and client computer systems. These computer systems 200 preferably include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are preferably used to support the operation of the facility, those skilled in the art will appreciate that the facility may be implemented using devices of various types and configurations.

To better illustrate the design and operation of the facility, it is discussed herein in conjunction with an example.

Figure 3:
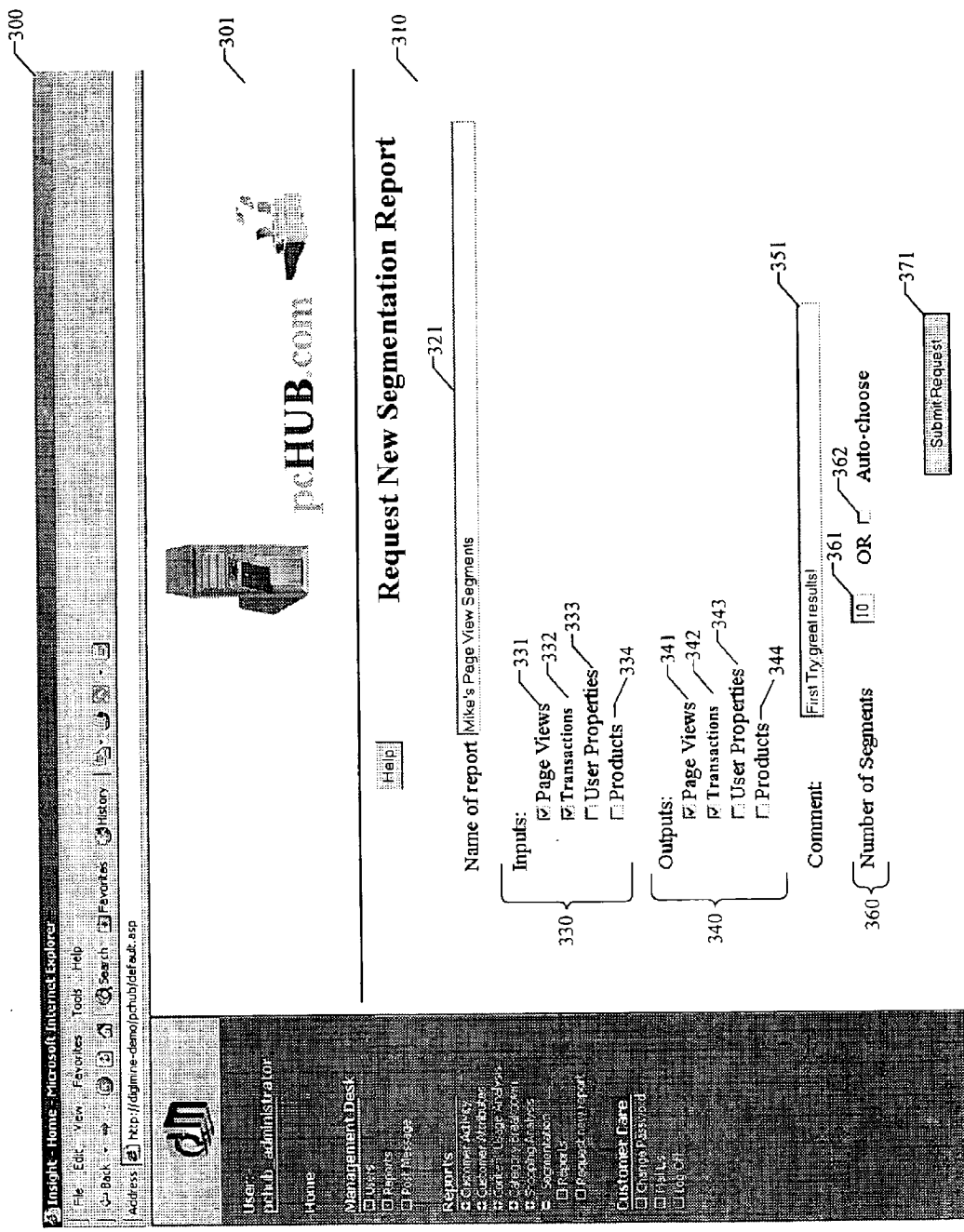
FIG. 3 shows an illustrative user interface for requesting a segmentation report, the segments are groups of which the facility is subsequently applied to characterize and name.

FIG. 3 shows an exemplary user interface for requesting a segmentation report for segmenting users into a set of segments or groups, each containing users whose activities are similar in significant respects. In some embodiments, the segments or groups characterized and named by the facility are those produced in this report. The user interface 310, displayed in the client area 301 of a browser window 300, includes fields and other controls for entering information about the requested segmentation report. The user enters a report name in name field 321, checks one or more input check boxes 331–334 to select inputs to the segmentation process, and checks one or more output check boxes 341–344 to select outputs to the segmentation process. The user further enters a comment in comment field 351, and either enters a number of segments to create in number of segments field 361 or checks the auto-choose check box 36 to cause the segmentation process to automatically select the appropriate number of segments based upon the input data. Finally, the user clicks the submit request button 371 in order to submit the request for a segmentation report.

The facility preferably operates in conjunction with a variety of segmentation techniques for identifying segments and producing segmentation reports, including clustering, decision trees, neural networks, and regression analysis. For example, the segmentation may be performed using clustering in accordance with, for example, R. O. Duda and P. E. Hart, *Pattern Classification and Scene Analysis*, John Wiley & Sons, New York, 1973. Alternatively, segmentation may be performed using decision trees in accordance with, for example, J. R. Quinlan, C4.5: *Programs for Machine Learning*, Morgan Kaufmann, 1993. Alternatively, segmentation may be performed using neural networks in accordance with, for example, C. M. Bishop, *Neural Networks for Pattern Recognition*, Claredon Press, Oxford, 1995. Alternatively, the segmentation may be performed using regression analysis, in accordance with, for example, Duda & Hart reference above. Additional segmentation techniques may also be applied.

Figure 4A:
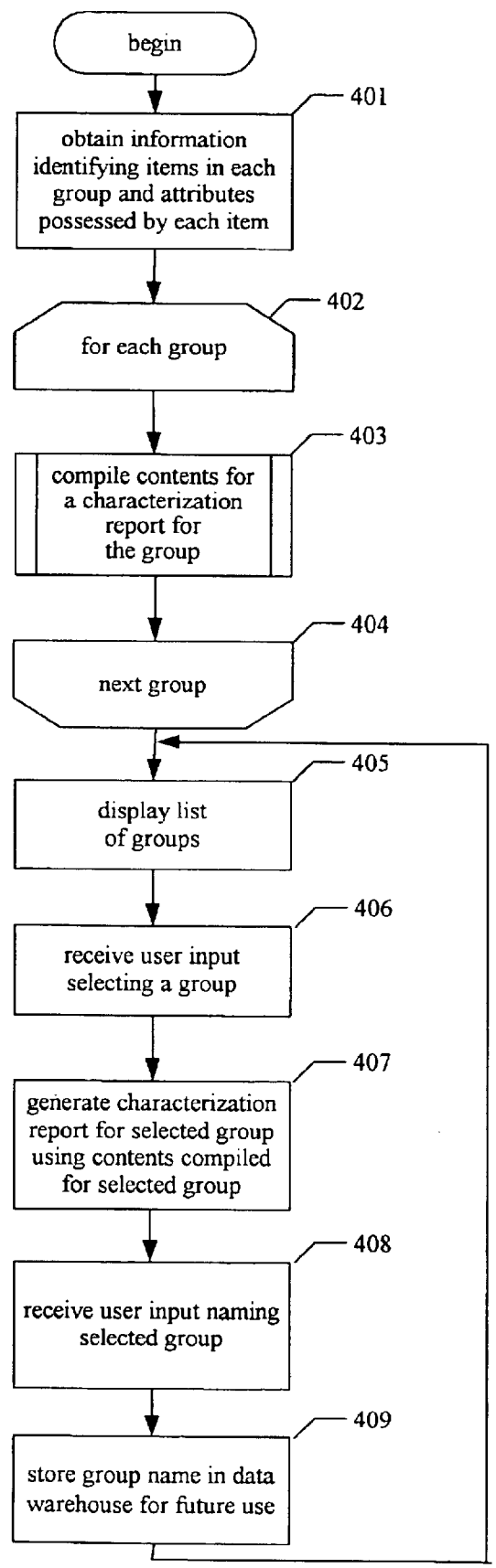
FIG. 4A is a flow diagram showing the steps illustratively performed by the facility in order to characterize a set of item groups, such as groups of users.

FIG. 4A is a flow diagram showing the steps preferably performed by the facility in order to characterize a set of item groups, such as groups of users. In step 401, the facility obtains information identifying items in each group, also called a "cluster" or a "segment." In step 401, the facility further obtains information identifying the attributes possessed by each item that is in any of the groups. FIG. 5 is a table diagram showing an example of a table obtained by the facility containing this information. The contents of this table are solely exemplary, and those skilled in the art will appreciate that the facility could obtain such data in a wide variety of different forms. The user group table 500 contains rows, such as rows 510–526, each corresponding to one item. In the case of this example, each item is a user, identified by a user identifier, or "user ID." Each row contains an indication 501 of the group of which the user is a member, and indication 502 of the user identifier of the user, and an indication 503 of the attributes possessed by the user. For example, row 515 indicates that the user having user ID 65 is a member of group 3, and possesses the following attributes: PurchasedAnyProduct, PurchasedAdventureGame, and PurchasedDrivingGame. As indicated by the ellipses in FIG. 5, rows 501–526 represent only a portion of the data analyzed in the example.

Those skilled in the art will recognize that, for many of the functions performed by the facility, the user ID of each user could be omitted. Also, rather than enumerating the attributes possessed by each user in a group, it is sufficient for some purposes to merely include, for a particular group, an indication of the number of users possessing each of the attributes. Additionally, the data shown in the user group table could be compressed in a variety of ways.

In step 402–404, the facility analyzes the data obtained in step 401 for the groups. The facility preferably repeats steps 402–404 for each group. In step 403, the facility compiles contents for a characterization report characterizing the current group.

FIG. 6 is a table diagram showing an attributes table used by the computer facility in compiling contents for characterization reports characterizing groups. Attributes table 600 is comprised of rows 611–622, each corresponding to a different attribute that may be possessed by any of the items in the groups. In the embodiment in which the items are users visiting a subject Web site, many of these attributes are actions that may be performed by the users, such as viewing the home page of the subject Web site (row 611), using a coupon (row 614), or purchasing an adventure game (row 616). Each row is divided into column 601–605 as follows: column 601 contains the name of the attribute. For example, the name of the attribute to which row 616 corresponds is "PurchaseAdventureGame." Column 602 contains a threshold value for the attribute. As is discussed in greater detail below, the facility compares the score calculated for each combination of group and attribute to the threshold for the corresponding attribute to determine whether values for the attributes for the group distinguish the group from the general population. For example, column 602 for row 616 contains the threshold 55, indicating that scores between 55 and 100 for the combination of the PurchaseAdventureGame attribute with a particular group will cause this attribute to be featured in a characterization of the group. Column 603 contains an identifier for icons associated with each attribute. For example, row 616 has the icon identifier of 6 in column 603, as do rows 618, 620 and 622. Column 604 contains a positive icon for each attribute. The positive icon is preferably used in the characterization report for a particular group when a greater number of users in the group possess the attribute than the general population. For example, row 616 contains an icon resembling a shopping cart in column 604, used to indicate that a larger percentage of the users in a particular group purchased a particular product than the users in the general population. Column 605 contains, in some cases, a negative icon for the attribute, which is preferably included by facility in a characterization report for a group in which a lower percentage of the users in the group than the general population possess the attribute. For example, row 616 contains in column 605 an icon resembling a shopping cart, overlaid by the international circle-slash negation symbol. While the information used by the facility for each attribute is shown in the form of Attributes Table 600 for clarity, those skilled in the art will appreciate that this information could be stored in a variety of other forms. As one example, the icons shown in columns 604 and 605 could be stored separately from the other data shown in Table 6, and/or non-redundantly.

Figure 4B:
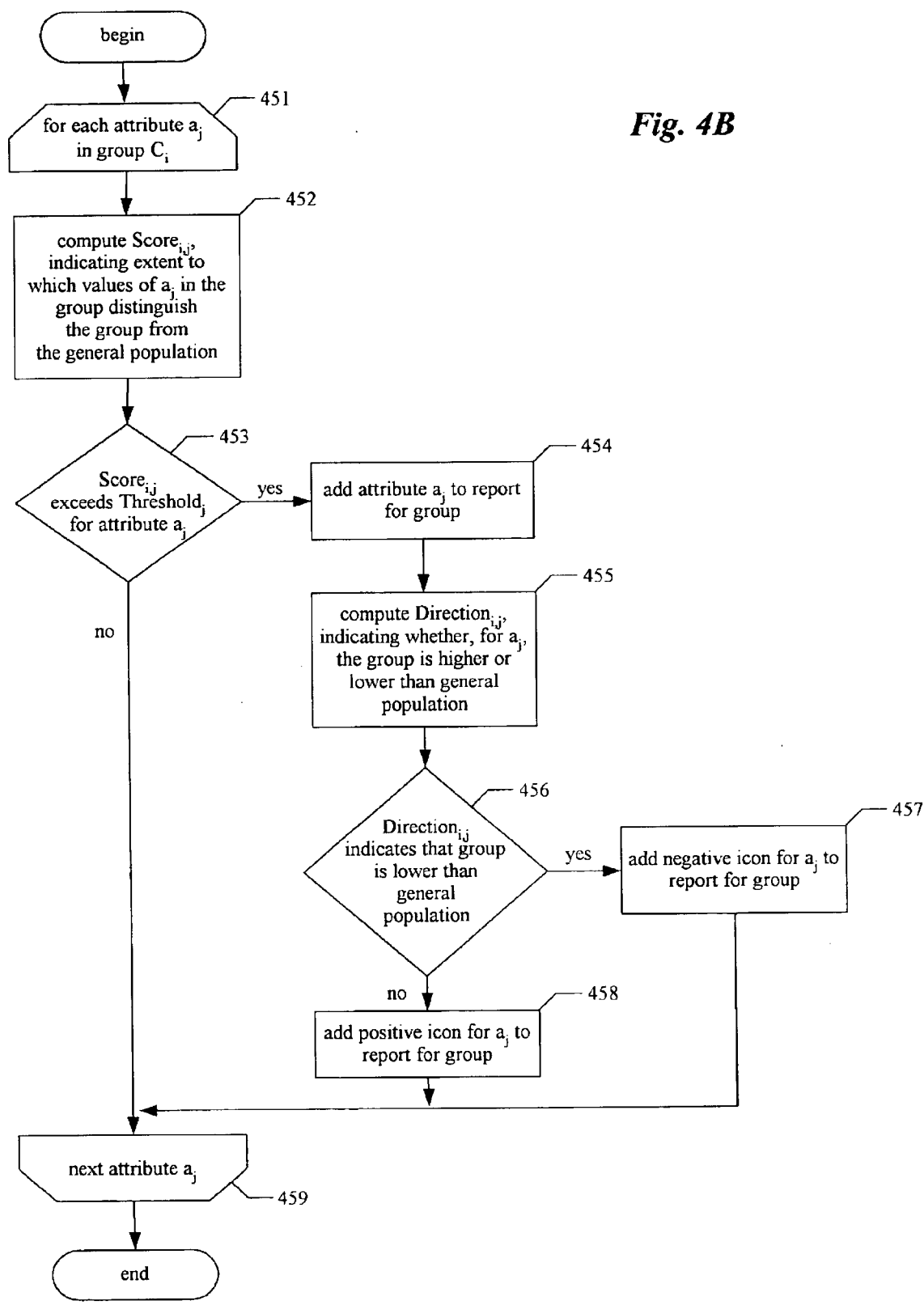
FIG. 4B is a flow diagram showing the steps illustratively performed by the facility in order to compile the contents for a characterization report for a particular group.

FIG. 4B is a flow diagram showing the steps preferably performed by the facility in order to compile the contents for a characterization report for a particular group $C_i$. In steps 451–459, the facility loops through each defined attribute for group $C_i$, denoted $a_j$. In step 452, the facility computes a value indicating the extent to which the values of $a_j$ in the group distinguish the group from the general population, denoted $Score_{ij}$. For each group and attribute, the Score is based on the likelihood that the attribute is independent of membership in the current group. This probability is in turn based upon the analysis of a $\chi^2$ distribution for a contingency table reflecting the occurrence of the attribute within and without the current group. The first step in this analysis is to construct a contingency table.

FIG. 7 is a table diagram showing the contingency table preferably used by the facility. The contingency table 700 has four cells. Cell 701 contains the value a, which is a count of the number of items in the group that possess the attribute. Cell 702 contains the value b, which is a count is of the items in groups other than the current group that possessed the attribute. Cell 703 contains the value c, which is a count of the items in the group that do not possess the attribute. Cell 704 contains the value d, which is a count of the items in groups other than the current group that do not possess the attribute.

Based upon values of a, b, c, and d derived from the obtained data, the facility next computes the Yates's adjusted value for the $\chi^2$ statistic for the contingency table using the formula shown below as equation (1), from Box, George E. P., Hunter, William G., and Hunter, J. Stuart, *Statistics for Experimenters*, John Wiley & Sons, New York, 1978, equation (5.40), p. 150.

$$\chi^2_{i,j} = \frac{\left[|ad - bc| - \frac{1}{2}(a+b+c+d)\right]^2 (a+b+c+d)}{(a+b)(c+d)(a+c)(b+d)} \quad (1)$$

The facility then uses the value obtained for $\chi_{i,j}^2$ to compute the probability that the attribute is independent of membership in the current group, denoted prob($\geq \chi_{i,j}^2$). In one embodiment, the facility determines this probability using Table C in Box at pp. 634–635. In an alternative embodiment, the facility computes this probability using a software-implemented numerical method, such as that described in Press, William H., Teukolsky, Sol A., Vetterling, William T., and Flannery, Brian P., *Numerical Recipes in C: The Art of Scientific Computing*, Second Edition, Cambridge University Press, 1997, pp. 620–621. From this probability, the facility generates a Score between 0 and 100 indicating the extent to which values of the attribute in the group distinguish the group from the general population using the formula shown below as equation (2).

$$\text{Score}_{i,j} = (1 - \text{prob}(\geq \chi_{i,j}^2)) \times 100 \quad (2)$$

While the calculation of a score is shown in the example in terms of binary attributes that can have only two values, true and false, embodiments of the facility also support multi-valued attributes, as well as continuously-valued attributes. For multi-valued attributes, the facility preferably uses a multi-valued version of the $\chi^2$ statistic. Also, the facility preferably uses Fisher's Exact Test in cases where the numbers in the contingency table are small, such as where each is less than 10. A multi-valued version of Fisher's Exact Test is used by some embodiments of the facility for multi-valued attributes. Further, additional embodiments of the facility utilize factor analysis techniques to score the attributes for each group. A further embodiment uses an uncertainty measure, such as Shannon's Entropy or mutual information, to score the attributes for each group.

In step 453, if the Score computed in step 452 exceeds a threshold established for this attribute, denoted Threshold$_j$, then the facility continues in step 454, else the facility continues in step 459. Various types of thresholds may be uses, such as a fixed value, the top N values, or those attributes who pass some significance test. Those skilled in the art will appreciate that details of the threshold table shown in FIG. 6 and the flow diagram shown in FIG. 4B may be straightforwardly adapted to these various types of thresholds. In steps 454–458, the facility proceeds to add information about the current attribute to the contents it is compiling for a characterization report for the group. In step 454, the facility adds the current attribute to the contents of the report. In step 453, the facility computes an indication of whether the members of the group have a higher or lower average value for the current attribute and the general population, denoted Direction$_{ij}$. This Direction is preferably computed based upon the values in the contingency table shown in FIG. 6 using the formula shown below in equation (3).

$$\text{Direction}_{i,j} = \frac{a}{a+c} - \frac{b}{b+d} \quad (3)$$

The formula for Direction in equation (3) may also be expressed as shown below in equation (3a).

$$\text{Direction}_{i,j} = \frac{a}{a+b} - \frac{a+b}{a+b+c+d} \quad (3a)$$

In step 456, if the computed direction indicates that the group has a lower average for the current attribute than the general population, that is, that Direction$_{i,j}$ is less than zero, then the facility continues in step 457, else the facility continues in 458. In step 457, the facility adds the negative icon for the current attribute to the contents of the report for the group. For instance, for the ViewedHomePage attribute, the facility would add the negative icon appearing at the intersection of row 611 and column 605 in Attributes Table 600. After step 457, the facility continues in step 459. In step 458, the facility adds a positive icon for the current attribute to the contents of the report for the group. For example, for the PurchasedAdventureGame attribute, the facility adds the positive icon occurring at the intersection of row 616 and column 604 of the attributes table 600. After step 458, the facility continues in step 459.

In step 459, the facility loops back to step 451 to process the next attribute. After the facility has processed each of the attributes, these steps conclude, and the facility continues in step 404 in FIG. 4A.

Returning to FIG. 4A, in step 404, after compiling the contents for a characterization report for the current group, the facility loops back to step 402 to process the next group. After all the groups have been processed, the facility continues in step 405.

Figure 8:
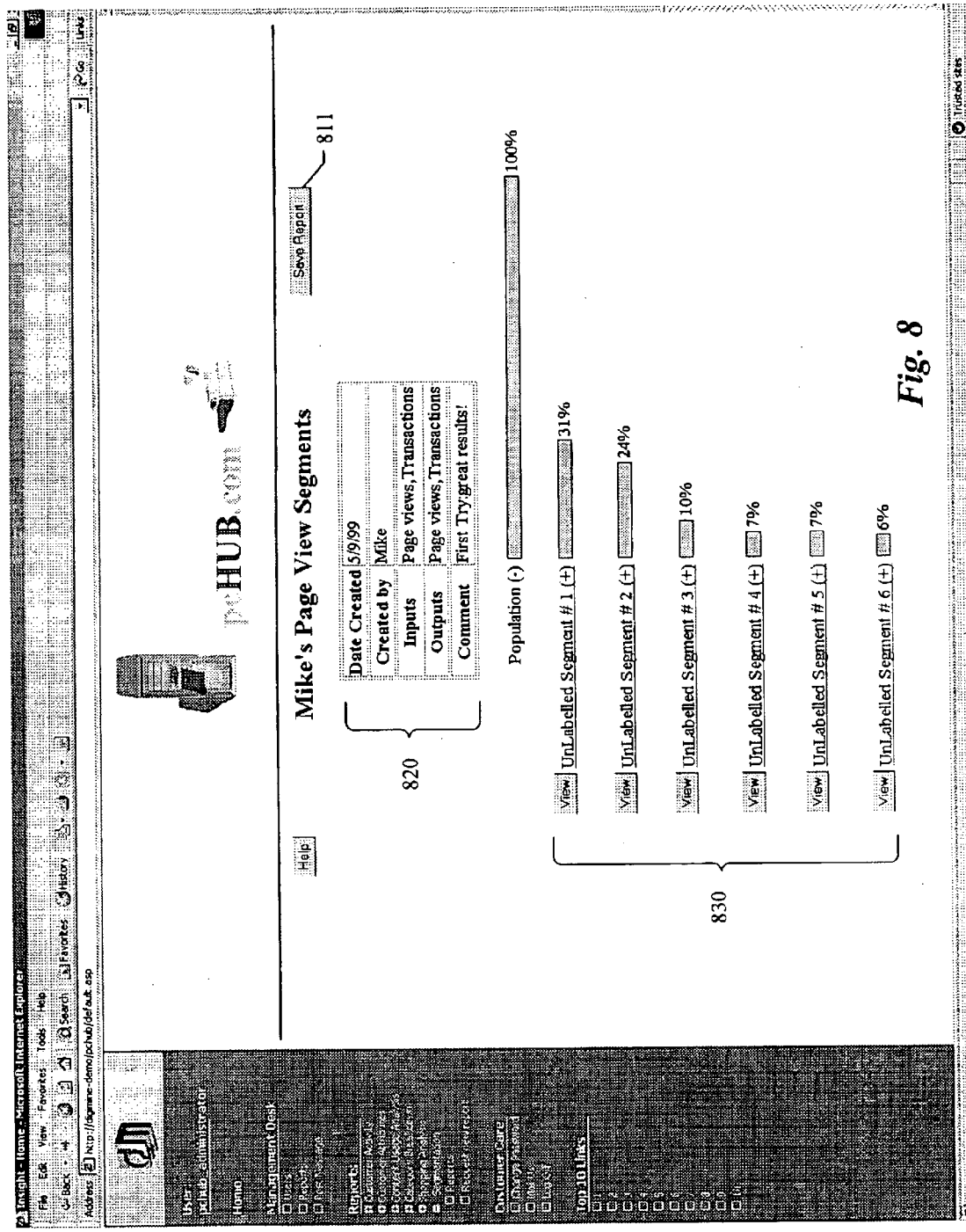
FIG. 8 is a display diagram showing the display of a segmentation report containing such a list of groups as requested using the user interface shown in FIG. 3.

In step 405, the facility displays a list of the groups to the user, such as the groups produced as part of the segmentation report requested using the user interface shown in FIG. 3. FIG. 8 is a display diagram showing the display of a segmentation report containing such a list of groups as requested using the user interface shown in FIG. 3. It can be seen that the segmentation report has a button 811 for saving the report, information 820 about the request for the report, and a list 830 of six segments of users identified in the segmentation process.

Figure 9:
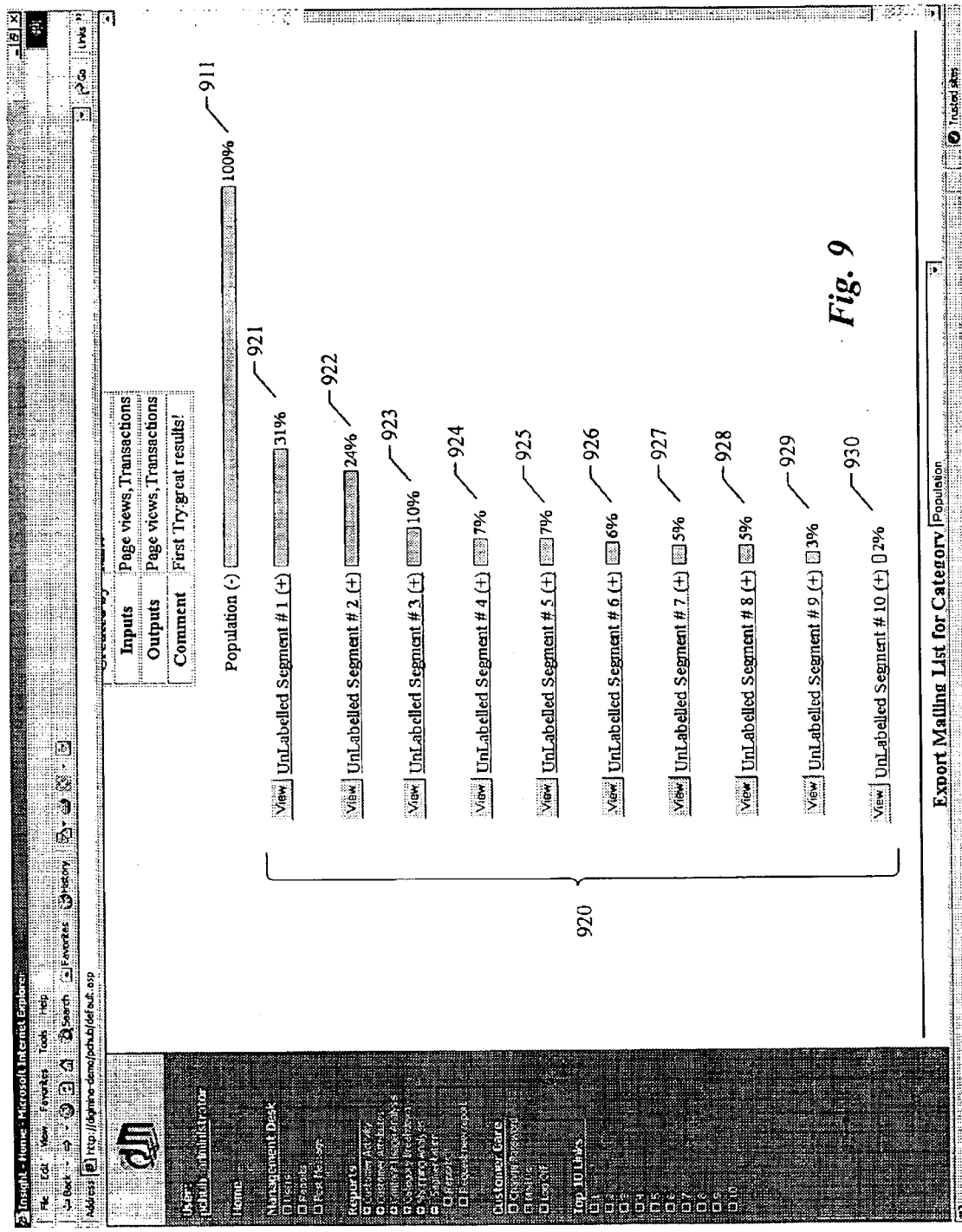
FIG. 9 is display diagram showing a scrolled version of FIG. 8 in which a complete list of user segments is visible.

FIG. 9 is display diagram showing a scrolled version of FIG. 8 in which a complete list of user segments is visible. The complete list 920 of user segments includes ten segments 921–930, labeled segment number one through segment number ten, respectively. Those skilled in the art will appreciate that any number of segments may be displayed. The number of displayed segments may be determined, for example, by the user, or may be determined automatically by the facility. Each segment in the list is accompanied by a bar whose length indicates the percentage of the users in the entire population of users that are contained in the segment. For example, segment 924 contains a bar indicating that seven percent of the general population is included in this segment. The user may preferably click on any of the segments or the view button to the left of any of the segments to view a characterization report for the segment and to persistently name the segment.

In step 406, the facility receives user input selecting a group. As an example, the user selects segment number four by clicking on segment 924. In step 407, the facility generates and displays a characterization report for the group selected in step 406. This report is based upon the contents compiled for the selected group in step 403.

Figure 10:
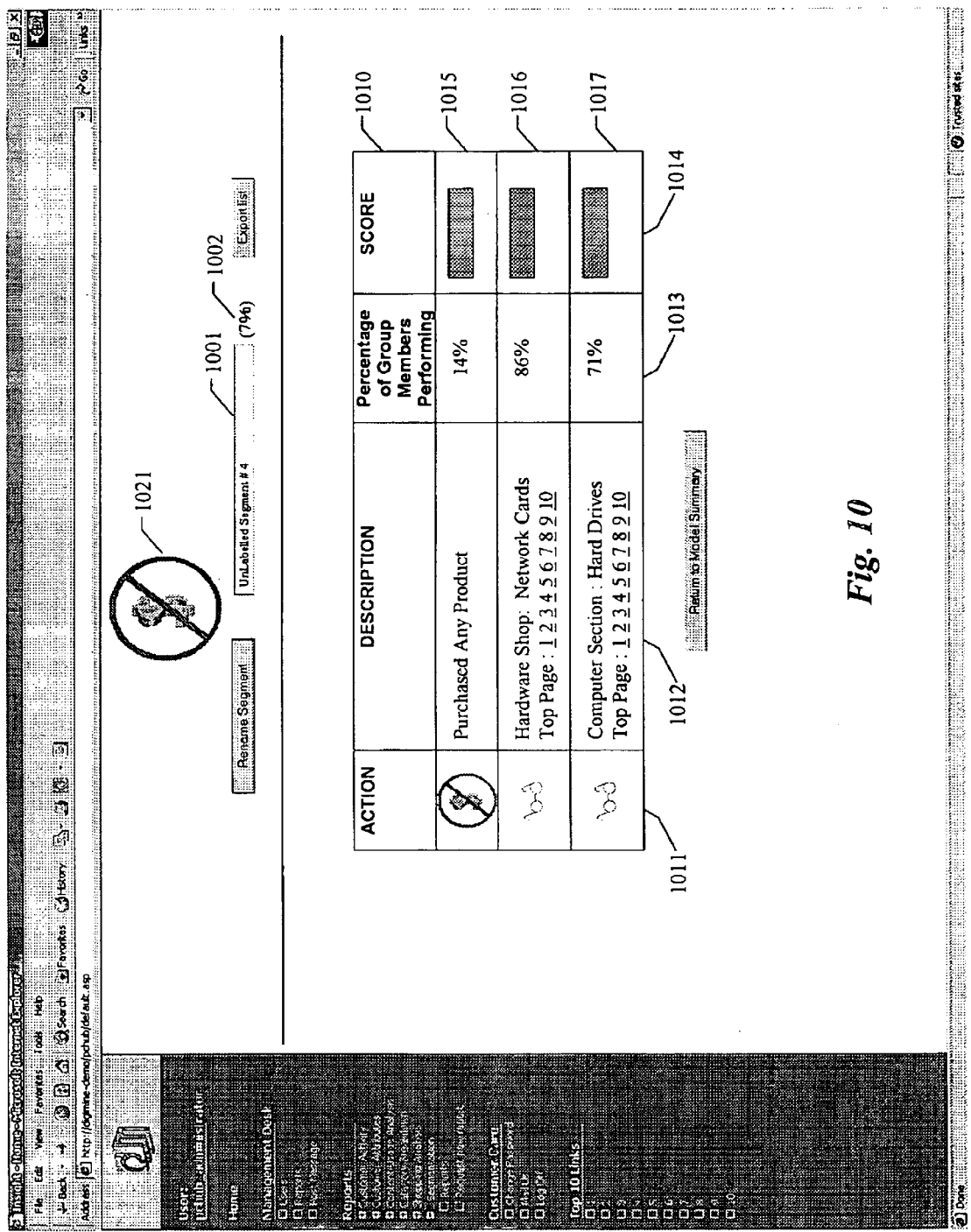
FIG. 10 is a display diagram showing a sample characterization report for segment number four.

FIG. 10 is a display diagram showing a sample characterization report for segment number four. The facility preferably displays the report in response to the user clicking on segment 924 shown in FIG. 9. The characterization report includes a segment name field 1001 indicating the temporary name assigned to the segment during the segmentation process, along with an indication 1002 of the percentage of general population of users that is contained by the segment. The characterization report further contains a characterization table 1010, comprised of rows 1015–1017. Each row corresponds to an attribute whose value differentiates segment number four from a general population of users—that is, attributes that are either possessed by a much larger or a much smaller percentage of the segment than of the general population of users. Each row is divided into four columns 1011–1014. Action column 1011 contains either a positive or negative icon for the attributes, depending upon whether a smaller or larger percentage of members of the group possess the attribute than the general population. For example, row 1015 shows a negative icon because a smaller percentage of the users in segment four purchased a product than the users in the general population. On the other hand, rows 1016 and 1017 have a positive icon, because a larger percentage of the members of the group purchased various types of items than the general population. Column 1012 contains a description of the attribute. Column 1013 contains an indication of the percentage of the group members that possess the attribute, or performed the action corresponding to the attribute. Finally, column 1014 contains a bar whose length indicates the score for the attribute and the group—that is, the extent to which values of the attribute for the group distinguish the group from the general population. The characterization report further includes an icon 1021 at the top of the screen for the attribute having the highest score.

Figure 11:
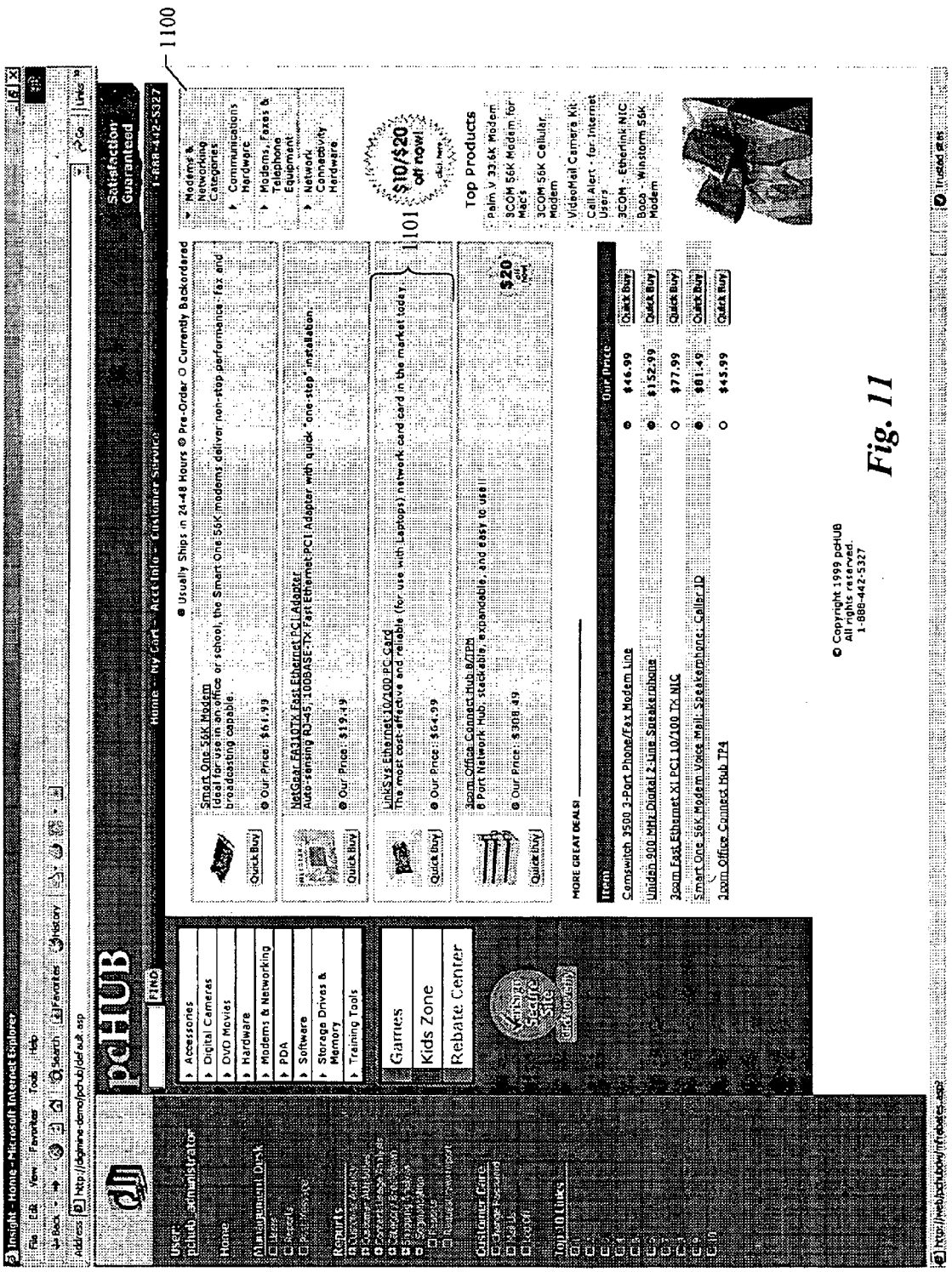
FIG. 11 is a display diagram showing the top-viewed Web page for a network card on the subject Web site.

For some of the attributes shown in the characterization report, the facility displays a list of top pages in the description column 1012, shown as the underlined numbers from 1 to 10. These top pages are a ranked list of the pages of the subject Web site on which users in the segment performed the action corresponding to the attribute. The user may preferably click on any of these numbers in order to view the corresponding Web page of the subject Web site. FIG. 11 is a display diagram showing the top-viewed Web page on the subject Web site for a network card. The Web page 1100 contains information 1101 about a network card that was most viewed by users in segment number four.

In step 408, the facility receive user input naming the selected group. In step 409, the facility stores the group name received in step 408 in the data warehouse for future use in conjunction with the current segment.

Figure 12:
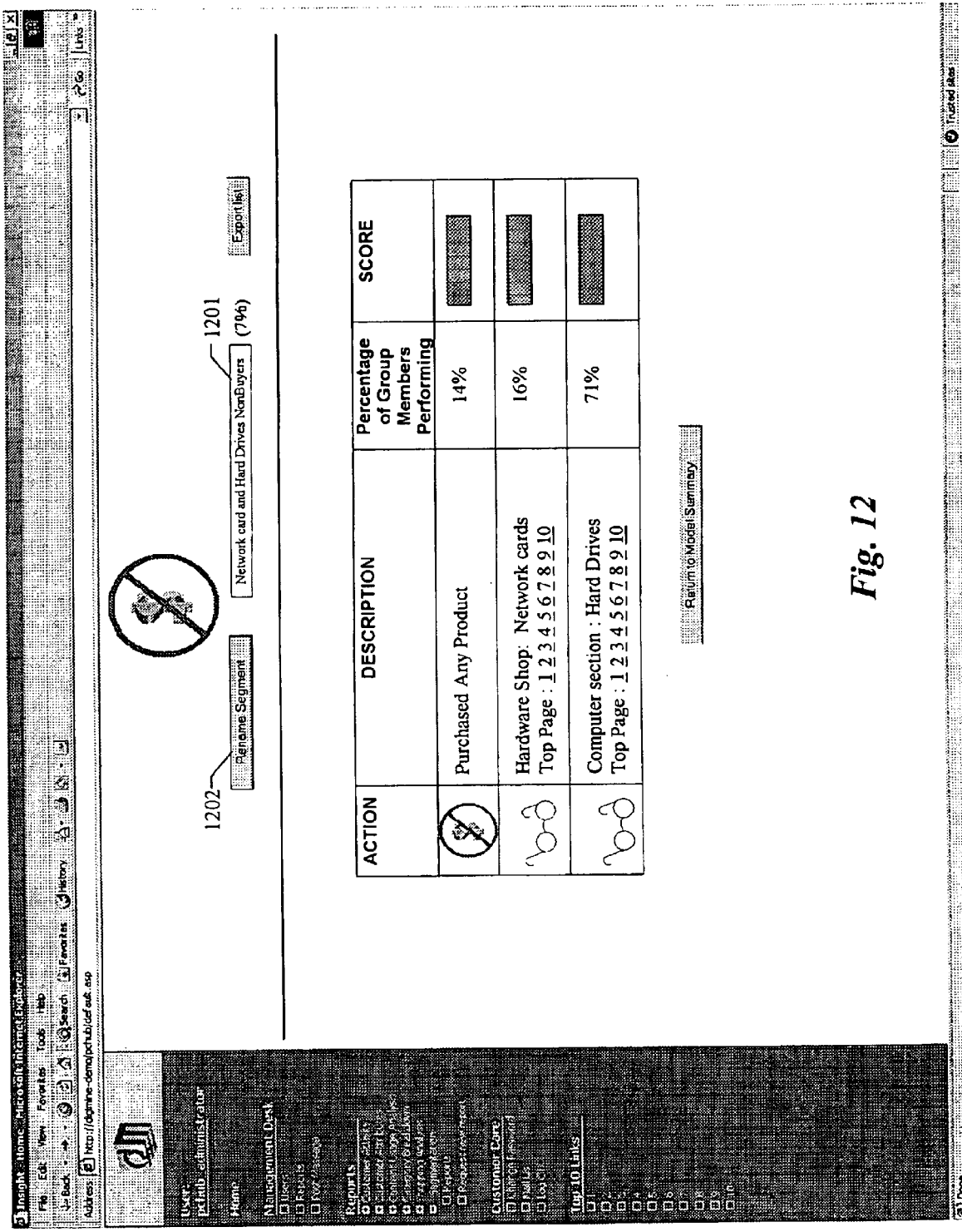
FIG. 12 is a display diagram showing the sample characterization report for segment number four in which the user is naming the segment.

FIG. 12 is a display diagram showing the sample characterization report for segment number four in which the user is naming the segment. FIG. 12 shows the user typing the following new name for the segment into the segment name field 1201: "Network card and Hard Drives Non-Buyers," based upon the high percentage of users in the segment that viewed pages for network cards and hard drives, and the low percentage of users in the segment that bought any products. The user then clicks the rename segment button 1202 in order to save this name for this segment.

After step 409, the facility continues in step 405 to again display the list of groups and permit the user to select another group to view the characterization report for that group and name that group.

Figure 13:
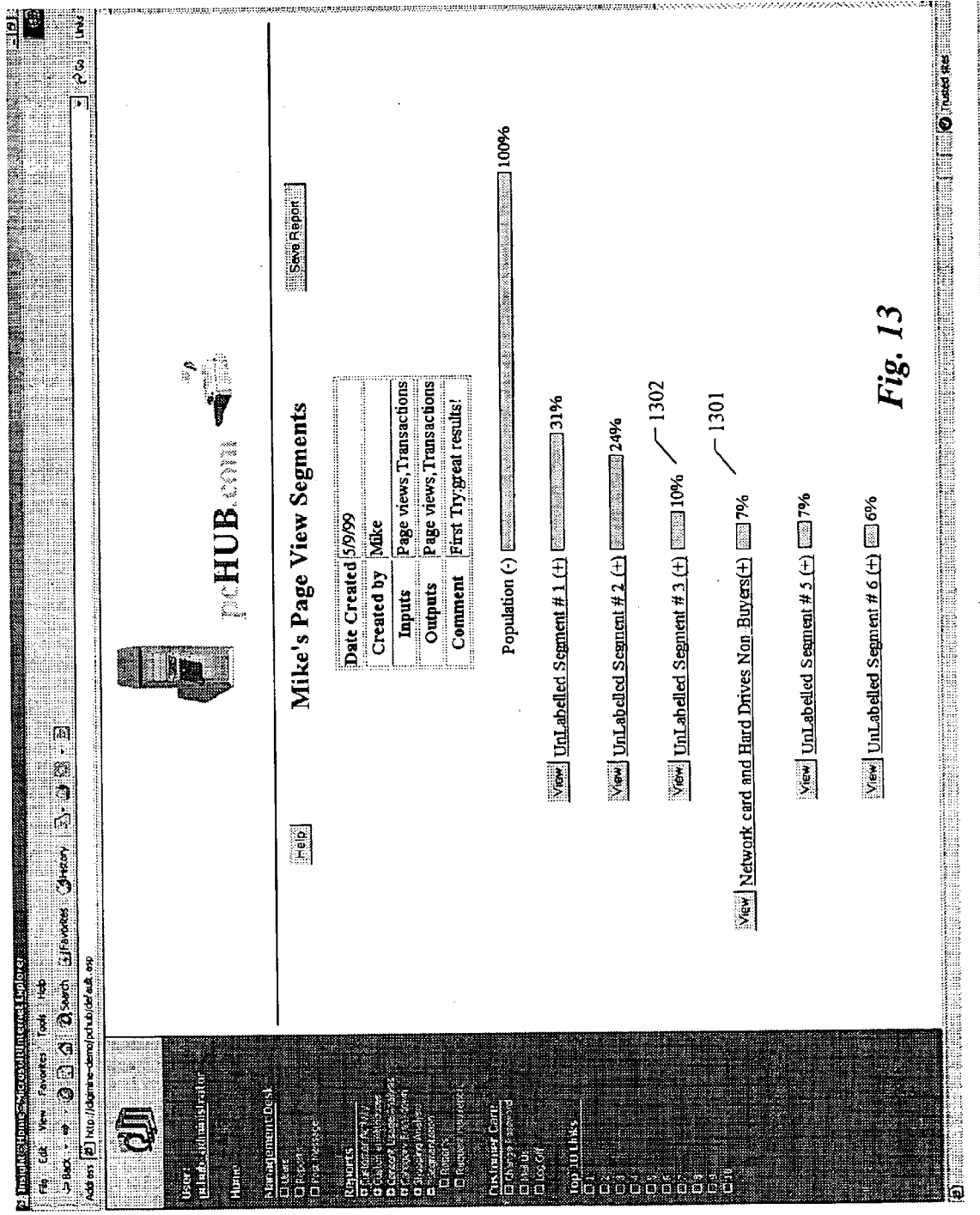
FIG. 13 is a display diagram showing the redisplayed list of groups after the user has specified a name for segment number four.

FIG. 13 is a display diagram showing the redisplayed list of groups after the user has specified a name for segment number four. It can be seen that, in the list of groups, segment number four at 1301 has been renamed to "Network Card and Hard Drives Non-Buyers." The user preferably selects segment 1302 in order to review the characterization report for segment number three and name it.

Figure 14:
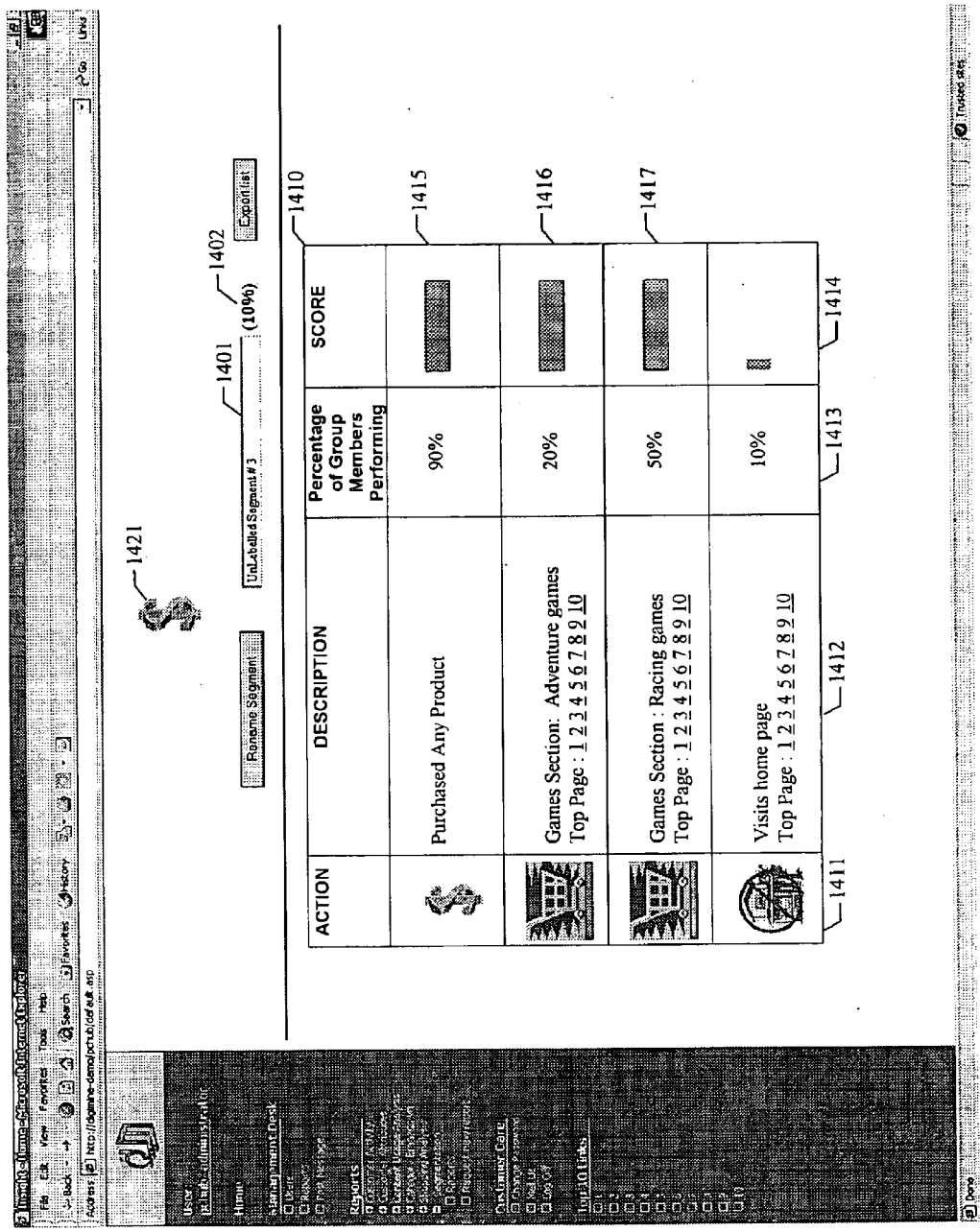
FIG. 14 is a display diagram showing a sample characterization report for segment number three.

FIG. 14 is a display diagram showing a sample characterization report for segment number three. The characterization report shown in FIG. 14 is similar to that shown in FIG. 10, and shows the four attributes that distinguish segment number three from the general population: a large number of them purchase a product, a large number of them purchased either an adventure game or a racing game, and a low percentage of them visited the home page of the subject Web site.

Figure 15:
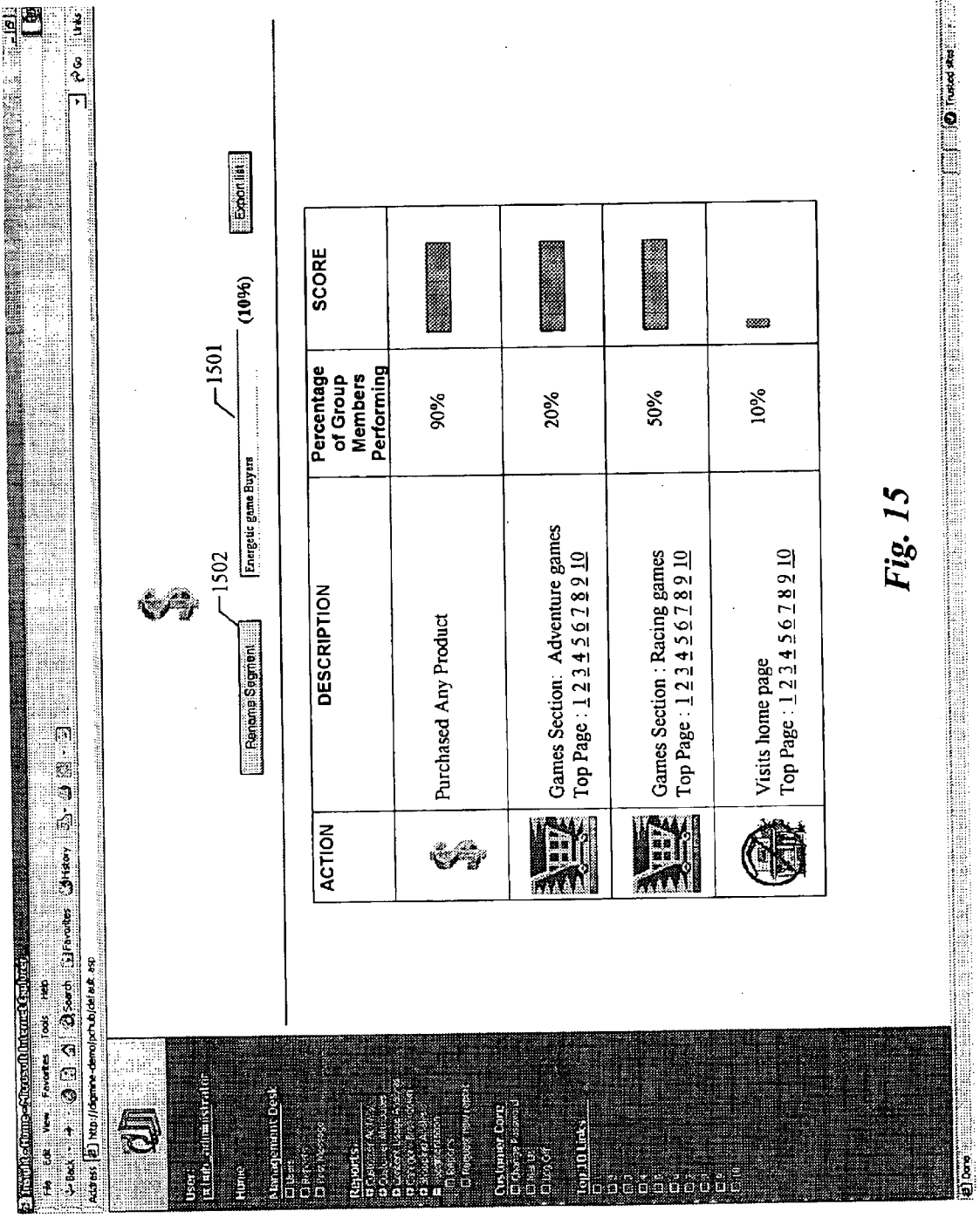
FIG. 15 is a display diagram showing the naming of segment number three.

FIG. 15 is a display diagram showing the naming of segment number three. It can be seen that the user has entered the segment name "Energetic Game Buyers" in segment name field 1501. The user then clicks the rename segment button 1502 in order to store this name with the segment.

Figure 16:
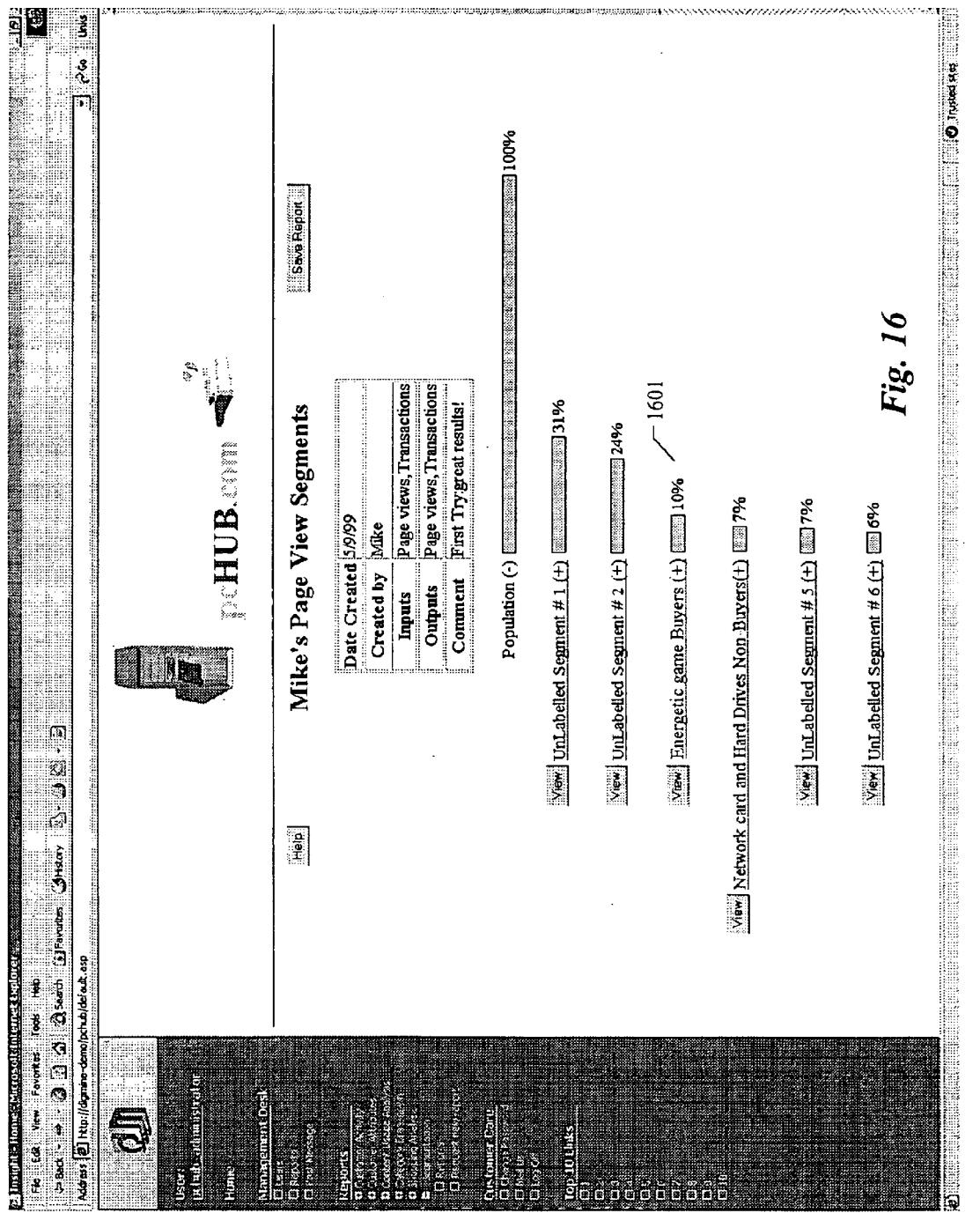
FIG. 16 is a display diagram showing the naming of segment number three.

FIG. 16 is a display diagram showing the naming of segment number three. It can be seen in the segment list that segment number three has been renamed "Energetic Game Buyers" at 1601. In a manner similar to that described above, the user may name each of the segments, at the same time reviewing their characterization reports to gain an understanding of the common elements of the members of each segment.

Figure 17:
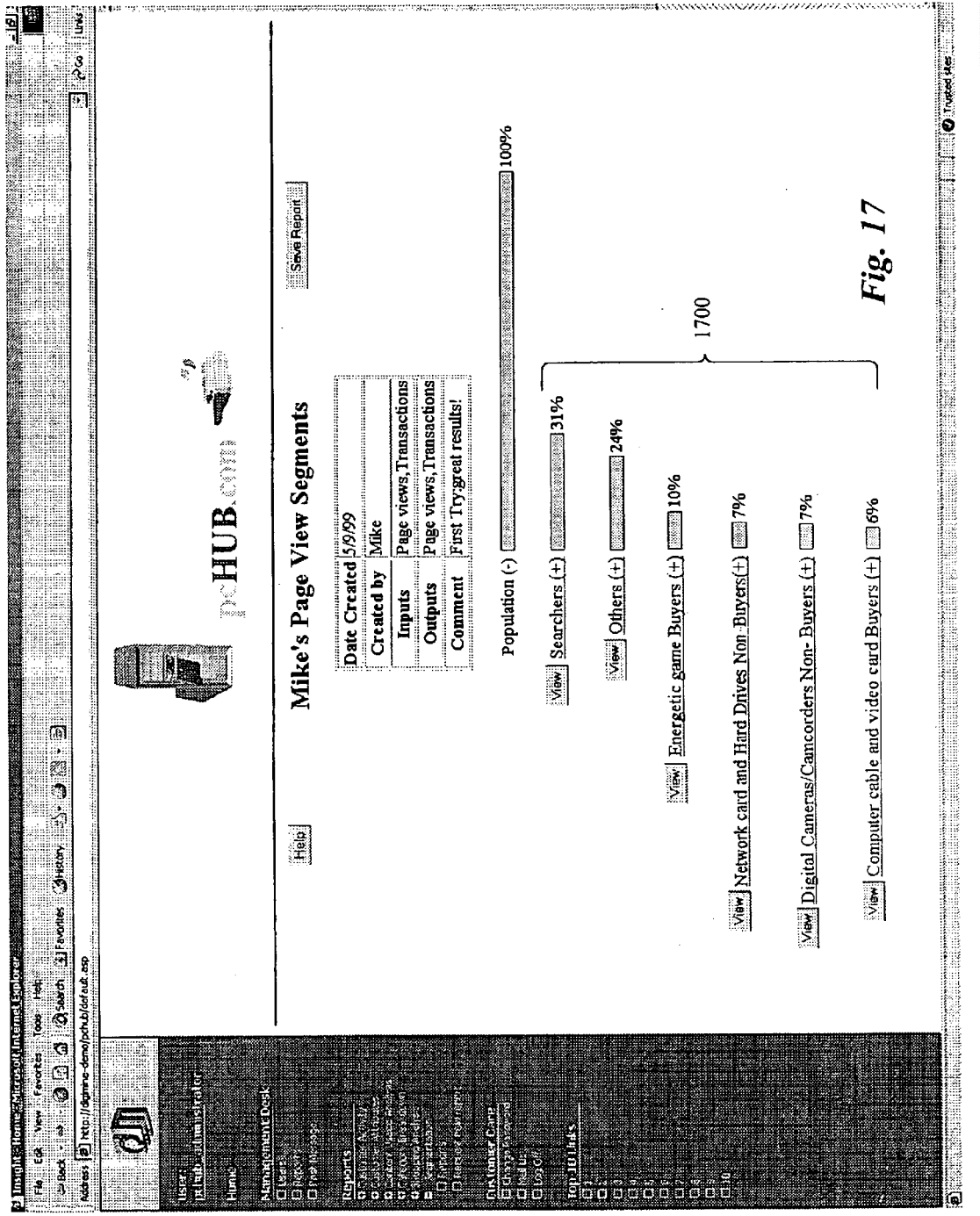
FIG. 17 is a display diagram showing the naming of each of the segments.

FIG. 17 is a display diagram showing the naming of each of the segments. It can be seen that each of segments in the segment list 1700 has been named by the user in a manner characterizing unique aspects of members of the segments set forth in the characterization reports for those segment.

It will be understood by those skilled in the art that the above-described facility could be adapted or extended in various ways. For example, the facility may be applied to characterize and name segments other than those containing the users, based upon attributes other than attributes reflecting the browsing activity. Additionally, such attributes may be multi-valued or continuously-valued. The facility may operate on groups or segments created in a variety of ways, and identified by information from various sources in various forms. While the foregoing description makes reference to preferred embodiments, the scope of the invention is defined solely by the claims that follow and the elements recited therein.

We claim:

1. A method in a computing system for classifying groups of users of a subject Web site, comprising:

retrieving information identifying, for each of a plurality of groups, users that are members of the group;

for each group, analyzing properties of the members of the group to identify properties that distinguish users that are members of the group from users that are not members of the group, the analyzed properties relating to interactions with the subject Web site undertaken by users;

for at least one selected group:

displaying the properties identified as distinguishing members of the selected group from users that are not members of the selected group;

receiving user input specifying a name to classify the selected group; and persistently storing the specified name in a manner that associates the specified name with the selected group, enabling the specified name displayed in conjunction with the selected group at a future time, wherein one or more properties are identified that reflect whether the users viewed a particular Web page.

2. The method of claim 1, further comprising, for each selected group, displaying with each property identified for the selected group an icon representing the property.

3. The method of claim 1 wherein one or more properties are identified that reflect whether the users purchased a particular item.

4. The method of claim 1 wherein one or more properties are identified that reflect whether the users viewed a Web page among a group of Web pages relating to a particular product category.

5. The method of claim 1 wherein one or more properties are identified that reflect whether the users purchased an item in a particular product category.

6. A method in a computing system for characterizing a selected group of items relative to one or more other groups of items, comprising:
displaying information identifying the selected group; and
in conjunction with the displayed information identifying the selected group, displaying one or more icons, each icon indicating a characteristic of members of the selected group that differentiates typical members of the selected group from typical members of the other groups,
wherein each item in the selected group is a user, and wherein a distinguished icon among the displayed icons indicates a characteristic reflecting either performance by users or failure of users to perform a selected action with respect to products in a selected product category, the method further comprising displaying, in conjunction with each displayed icon, one or more product indications, the displayed products indications indicating the products in the selected product category with respect to which the largest numbers of the users of the selected group either performed the selected action or failed to perform the selected action.

7. The method of claim 6 wherein a plurality of icons are displayed, and wherein the plurality of icons is displayed in an order corresponding to the extent to which the characteristic indicated by each differentiates typical members of the selected group from typical members of the other groups.

8. The method of claim 6, further comprising displaying, in conjunction with each displayed icon, an indication of the extent to which the characteristic indicated by each differentiates typical members of the selected group from typical members of the other groups.

9. The method of claim 6, further comprising displaying, in conjunction with each displayed icon, a shape whose length indicates the extent to which the characteristic indicated by the displayed icon differentiates typical members of the selected group from typical members of the other groups.

10. The method of claim 6, further comprising displaying, in conjunction with each displayed icon, an indication of the extent to which the members of the selected group has the characteristic indicated by the icon.

11. The method of claim 6, further comprising displaying, in conjunction with each displayed icon, the percentage of the members of the selected group has the characteristic indicated by the icon.

12. The method of claim 6 wherein the displayed product indications are displayed in an order corresponding to the number of users of the selected group either performed the selected action or failed to perform the selected action.

13. The method of claim 6 wherein a Web site includes a Web page for each product in the selected product category, and wherein the selected action is viewing the Web page for a product in the selected product category.

14. The method of claim 6 wherein a Web site includes a Web page in a selected Web page category, and wherein the selected action is viewing the Web page in the selected Web page category.

15. The method of claim 6 the selected action is purchasing a product in the selected product category.

16. The method of claim 6 wherein a Web site includes a Web page for each product in the selected product category, and wherein each displayed product indication includes a link to the Web page for the product indicated by the product indication.

17. The method of claim 6 wherein the characteristic indicated by a distinguished one of the displayed icons is possession of a distinguished attribute by at least a portion of the members of the selected group.

18. The method of claim 6 wherein the characteristic indicated by a distinguished one of the displayed icons is non-possession of a distinguished attribute by at least a portion of the members of the selected group.

19. The method of claim 6 wherein the displayed icons characterize a selected group of users of a Web site.

20. The method of claim 6 wherein one of the displayed icons conveys the likeness of a shopping basket.

21. The method of claim 6 wherein the displayed icons are brand logo icons that indicate actions related to one or more brands of products.

22. The method of claim 6 wherein one of the displayed icons conveys the likeness of a shopping basket overlaid by a circle-slash symbol indicating negation.

23. The method of claim 6 wherein one of the displayed icons indicates a high number of item purchases.

24. The method of claim 6 wherein one of the displayed icons indicates a low number of item purchases.

25. The method of claim 6 wherein one of the displayed icons conveys the likeness of a coupon.

26. The method of claim 6 wherein one of the displayed icons conveys the likeness of a coupon overlaid by a circle-slash symbol indicating negation.

27. The method of claim 6 wherein one of the displayed icons indicates a high level of coupon use.

28. The method of claim 6 wherein one of the displayed icons indicates a low level of coupon use.

29. The method of claim 6 wherein one of the displayed icons conveys the likeness of a dollar sign.

30. The method of claim 6 wherein one of the displayed icons conveys the likeness of a dollar sign overlaid by a circle-slash symbol indicating negation.

31. The method of claim 6 wherein one of the displayed icons indicates a high level of spending.

32. The method of claim 6 wherein one of the displayed icons indicates a low level of spending.

33. The method of claim 6 further comprising displaying a control usable by a user to specify a name for the selected group.

34. The method of claim 6 wherein the selected group and the other groups are mutually exclusive, in that no item belongs to more than one group.

35. A computing system for characterizing a selected group of items relative to one or more other groups of items, comprising:
a display device; and
a display generation subsystem that causes to be displayed together on the display device:

information identifying the selected group, and one or more icons, each icon indicating a characteristic of members of the selected group that differentiates typical members of the selected group from typical members of the other groups, wherein each item in the selected group is a user, and wherein a distinguished icon among the displayed icons indicates a characteristic reflecting either performance by users or failure of users to perform a selected action with respect to products in a selected product category, the method further comprising displaying, in conjunction with each displayed icon, one or more product indications, the displayed products indications indicating the products in the selected product category with respect to which the largest numbers of the users of the selected group either performed the selected action or failed to perform the selected action.

36. The computing system of claim 35 wherein the display generation subsystem causes a plurality of icons to be displayed, in an order corresponding to the extent to which the characteristic indicated by each differentiates typical members of the selected group from typical members of the other groups.

37. The computing system of claim 35 wherein the display generation subsystem causes to be displayed, in conjunction with each displayed icon, an indication of the extent to which the characteristic indicated by each differentiates typical members of the selected group from typical members of the other groups.

38. The computing system of claim 35 wherein the display generation subsystem causes to be displayed, in conjunction with each displayed icon, a shape whose length indicates the extent to which the characteristic indicated by the displayed icon differentiates typical members of the selected group from typical members of the other groups.

39. The computing system of claim 35 wherein the display generation subsystem causes to be displayed, in conjunction with each displayed icon, the percentage of the members of the selected group has the characteristic indicated by the icon.

* * * * *